W. H. JACKSON.
MOUSE AND RAT TRAP.
APPLICATION FILED JAN. 15, 1916.

1,218,406. Patented Mar. 6, 1917.

WITNESSES:

INVENTOR
WILLIAM H. JACKSON,
BY Munn & Co.
ATTORNEYS

UNITED STATES PATENT OFFICE.

WILLIAM HARRIS JACKSON, OF STERLING, KANSAS.

MOUSE AND RAT TRAP.

1,218,406. Specification of Letters Patent. Patented Mar. 6, 1917.

Application filed January 15, 1916. Serial No. 72,242.

*To all whom it may concern:*

Be it known that I, WILLIAM H. JACKSON, a citizen of the United States, and a resident of Sterling, in the county of Rice and State of Kansas, have invented a certain new and useful Improvement in Mouse and Rat Traps, of which the following is a specification.

One of the principal objects of my invention is to provide an improved mouse and rat trap in which provision is made for the safety of children, cats, dogs, chickens, and other animals, so that the trap may be set in places ordinarily frequented by them without danger of resultant harmful injury.

Another object of the invention resides in the provision of a rat trap in the nature of a compartment or plurality of compartments, having a top and front wall which may be opened to give access to the compartment in removing dead animals or in cleaning or re-baiting the trap, the device affording, when the walls are closed, an opening near the top of the compartment and through which the animal may have access to the compartment, the trap being arranged in the lower portion of the compartment in such position as to be actuated when the animal jumps down into the lower portion of the compartment.

A further object of the invention is to provide an improved trap of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings, in which like characters of reference indicate like parts throughout the several figures, of which—

Figure 1:
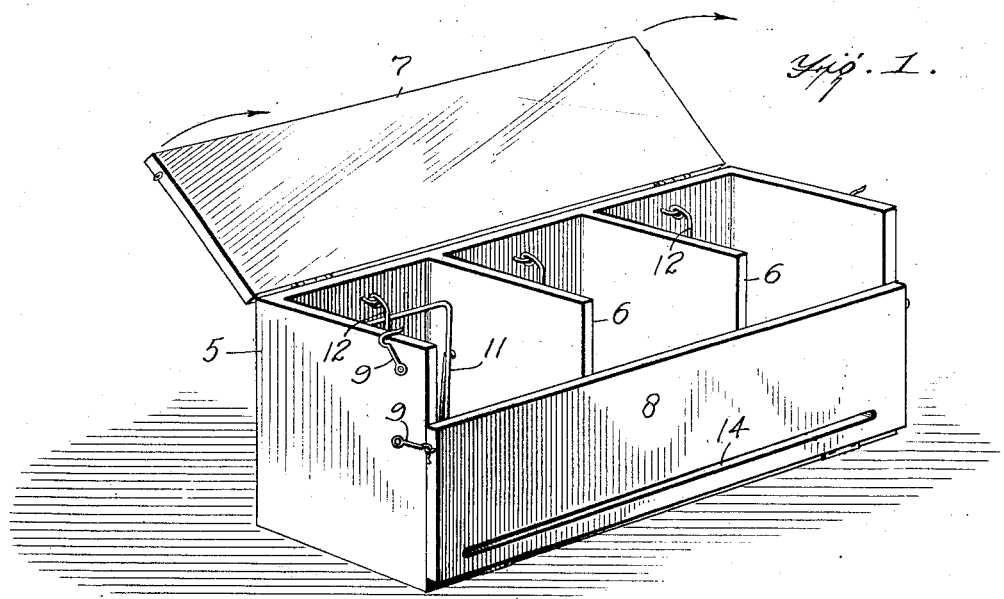
Figure 1 represents a view in perspective of an improved mousetrap constructed according to my invention, the top thereof being shown in open position.

In carrying out my invention, I provide a trap including a box or housing 5 having a plurality of partitions 6 arranged transversely thereof in spaced relation to each other, whereby the box will be divided into a number of compartments. Hinged to the top of the casing is a top wall 7, which when closed down forms a roof or cover for the compartments. A front wall 8 is hinged at its lower edge to the bottom wall of the casing or boxing. Suitable fastening means such as hooks and eyes indicated at 9 are provided for retaining the cover 7 and front wall 8 in closed position at will. It will be noted that the front wall 8 is of a height somewhat less than the height of the casing or boxing, so that each of the compartments thus has an opening at 10 in its front wall and near the top thereof. Through this opening entrance into the compartment by small animals may be had.

Figure 2:
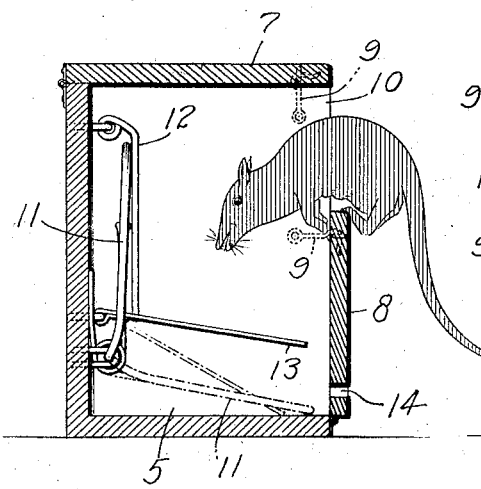
Fig. 2 represents a view in section taken vertically and transversely through the trap.
Figure 3:
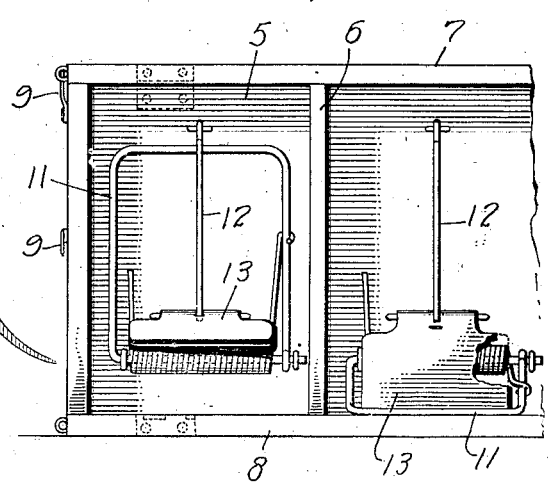
Fig. 3 represents a partial side elevational view of the trap, the front wall being in opened position.

Arranged within each of the compartments is a trap consisting of a spring actuated preferably rectangular jaw 11, which is hingedly connected to the rear wall of the compartment. Hinged to the rear wall above jaw 11 is a restraining pin or detent 12. A trigger platform 13 is hinged to the rear wall of the compartment above the point at which the jaw is hinged, said platform extending outwardly through the jaw and being provided with an opening for receiving the lower end of the restraining pin 12. When the trap is in set position as indicated in Fig. 2, the jaw is raised against the tension of its spring and the pin extending in front of the jaw projects at its lower end through the opening in the trigger platform, in the manner shown. When an animal enters the compartment through the opening 10, and steps or drops upon the platform, the latter will release the restraining pin and the jaw, in swinging downwardly, will strike the animal and cause its death. The door 8 near its lower edge, and along a line above the floor of the casing, is provided with a longitudinal slot 14, through which the odor of grain or other bait placed on the floor of the compartments, may pass so that the animals will be attracted to the trap.

It has been found that such a trap as I provide is very effective in attaining the purpose for which it is designed, and that it may be used without danger to the occupants of a house or to large animals.

Although I have described the preferred embodiment of my invention, I may desire to make such changes in the construction, combination, and arrangement of parts thereof, as do not depart from the spirit of the invention and the scope of the appended claim.

I claim:—

A trap including a compartment having an entrance opening defined in its upper portion, an animal killing apparatus arranged within the compartment including an actuating means arranged at a distance above the floor of the compartment, whereby a space is defined for receiving bait, and at a distance from the entrance opening, whereby the said actuating means will be operated only when an animal falls into the compartment through the entrance opening, and means for establishing atmospheric communication with the compartment below the said actuating means for allowing the odor of bait to pass out of the compartment.

WILLIAM HARRIS JACKSON.